US008672758B2

(12) United States Patent
Jaouen et al.

(10) Patent No.: US 8,672,758 B2
(45) Date of Patent: Mar. 18, 2014

(54) STEERING COLUMN GAME CONTROLLER

(75) Inventors: Jean-Yves Jaouen, Saint Jean la Poterie (FR); Patrick Pennaneac'h, Chateaubourg (FR); Gilles Raulet, Vannes (FR)

(73) Assignee: Guillemot Corporation, Chantpie (FR)

( * ) Notice: Subject to any disclaimer, the term of this patent is extended or adjusted under 35 U.S.C. 154(b) by 0 days.

(21) Appl. No.: 13/106,256

(22) Filed: May 12, 2011

(65) Prior Publication Data

US 2011/0281649 A1 Nov. 17, 2011

(30) Foreign Application Priority Data

May 12, 2010 (FR) ...................................... 10 53757

(51) Int. Cl.
*A63F 9/00* (2006.01)
(52) U.S. Cl.
USPC ............................................................. 463/36
(58) Field of Classification Search
None
See application file for complete search history.

(56) References Cited

U.S. PATENT DOCUMENTS

| | | | | |
|---|---|---|---|---|
| 4,603,752 A * | 8/1986 | Chambers et al. | ............. | 180/6.4 |
| 5,056,787 A * | 10/1991 | Mitsuyoshi | ............... | 273/148 B |
| 5,277,584 A * | 1/1994 | DeGroat et al. | ................ | 434/29 |
| 5,317,336 A * | 5/1994 | Hall | .............. | 345/164 |
| 5,589,828 A * | 12/1996 | Armstrong | ...................... | 341/20 |
| 5,589,854 A * | 12/1996 | Tsai | .............. | 345/161 |
| 5,618,995 A * | 4/1997 | Otto et al. | ........................ | 73/669 |
| 5,629,594 A * | 5/1997 | Jacobus et al. | ........... | 318/568.11 |
| 5,727,188 A * | 3/1998 | Hayes | ................................ | 703/8 |
| 5,823,876 A * | 10/1998 | Unbehand | ........................ | 463/37 |
| 5,829,745 A * | 11/1998 | Houle | ......................... | 273/148 B |
| 5,951,018 A * | 9/1999 | Mamitsu | ........................ | 273/442 |
| 5,989,123 A * | 11/1999 | Tosaki et al. | ...................... | 463/37 |
| 6,020,875 A * | 2/2000 | Moore et al. | .................. | 345/156 |
| 6,279,906 B1 * | 8/2001 | Sanderson et al. | ......... | 273/148 B |
| 6,283,859 B1 * | 9/2001 | Carlson et al. | ................... | 463/36 |
| 6,296,571 B1 * | 10/2001 | McVicar | .......................... | 463/38 |
| 6,342,880 B2 * | 1/2002 | Rosenberg et al. | ........... | 345/161 |
| 6,752,716 B1 * | 6/2004 | Nishimura et al. | ............... | 463/6 |
| 6,976,677 B1 * | 12/2005 | McVicar | .................... | 273/148 B |
| 7,662,042 B2 * | 2/2010 | Oswald | ............................ | 463/46 |
| 7,753,787 B2 * | 7/2010 | Arche et al. | ..................... | 463/37 |
| 8,072,418 B2 * | 12/2011 | Crawford et al. | ............. | 345/156 |
| 8,088,005 B2 * | 1/2012 | Burgel et al. | .................... | 463/37 |
| 2003/0171190 A1 * | 9/2003 | Rice | .................................. | 482/57 |
| 2005/0042578 A1 * | 2/2005 | Ammon et al. | ................. | 434/62 |

(Continued)

*Primary Examiner* — Seng H Lim
(74) *Attorney, Agent, or Firm* — Blakely, Sokoloff, Taylor & Zafman LLP

(57) ABSTRACT

The invention relates to a video game controller (1) having a rotatable actuator (2) with respect to a frame (3), so as to simulate at least one simulated vehicle steering column rotation control. According to the invention, said actuator (2) is translatably mounted with respect to said fixed frame (3), on a predetermined movement range, using an assembly of two sliding parts (4, 5) with one or both sliding with respect to the other, one of said sliding parts (4, 5) being rigidly connected to said actuator (2) and the other to said fixed frame (3), a first of said sliding parts (4) comprising at least one slot (F), accessible by an opening (41) in which one penetrating portion (51) of the second of said sliding parts (5) moves along one separate axis of the rotation movement axis of said actuator (2), the translation movement of said actuator (2) being generated by electromagnetic means controlled by an electrical signal, the first of said sliding parts comprising at least one winding and the second of said sliding parts comprising a magnet.

16 Claims, 12 Drawing Sheets

(56) References Cited

U.S. PATENT DOCUMENTS

| | | | |
|---|---|---|---|
| 2007/0265077 A1* | 11/2007 | Tom et al. | 463/37 |
| 2008/0070197 A1* | 3/2008 | Yu | 434/62 |
| 2008/0297328 A1* | 12/2008 | Crawford et al. | 340/407.2 |
| 2010/0160016 A1* | 6/2010 | Shimabukuro et al. | 463/16 |
| 2011/0190058 A1* | 8/2011 | Houston et al. | 463/36 |
| 2011/0256930 A1* | 10/2011 | Jaouen | 463/37 |

* cited by examiner

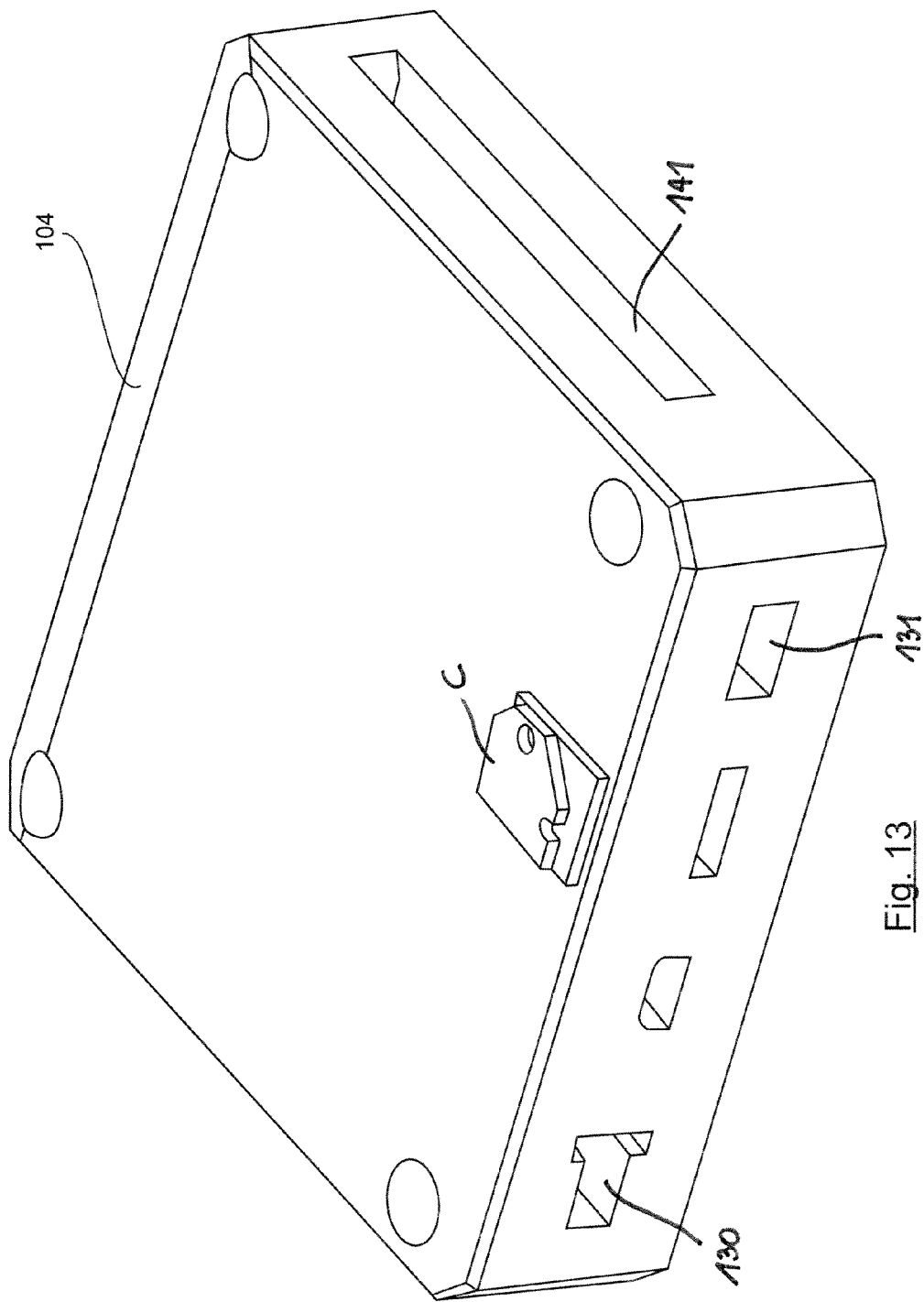

STEERING COLUMN GAME CONTROLLER

BACKGROUND

1. Field of the Invention

The field of the invention is that of interactive gaming hardware and accessories for PCs and games consoles. More specifically, the invention relates to a game controller comprising a rotatably movable element rigidly connected to a steering column supported by a frame. It may for example consist of a steering wheel, handlebars, or any other element suitable for use in a simulation game, particularly for controlling the movements of a vehicle. Indeed, some video games involve a simulated vehicle moving in a simulated environment. The reproduction of the simulated vehicle may be a faithful reproduction of an actual vehicle, but may also be merely based on an actual vehicle, or have no connection with reality.

2. Background

For controlling video games, the use of various types of interfaces, particularly in the form of steering wheels or handlebars is known, according to the applications and requirements and generally in the aim of approximating reality as much as possible. In this way, for a video game simulating driving a vehicle, the use of an actuator corresponding in the shape and use thereof to the type of vehicle being driven results in the simulation being more realistic, for example, the use of a steering wheel having the shape and functions of a touring vehicle steering wheel for a touring vehicle racing game.

Conventionally, steering column video game controllers comprise at least one portion suitable for gripping (steering wheel or handlebars, for example) pivotably mounted about an axis with respect to a frame enabling the user to vary the trajectory of the simulated vehicle.

In some controllers, the rotation of the steering column is boosted by a torque and vibration effect system by means, for example, of one or a plurality of rotary electric motors acting on the steering column via a gear and/or toothed belt system. Such a system makes it possible to create vibrations in the steering wheel and/or a torque applied to the actuator which may vary in amplitude according to whether an impact, a passage on a vibrator, a specific surface on which the vehicle is moving is involved.

Such a video game controller can not only convert the movements applied to the portion suitable for gripping (steering wheel) by the user into digital data which is sent to the software, but can also convert mechanical settings from the software to forces applied to the steering wheel which are felt by the user.

One drawback of such a video game controller is that the reproduction by the steering wheel of the mechanical settings from the software is still not realistic enough, and is thus not satisfactory.

AIMS OF THE INVENTION

The aim of the invention is particularly that of remedying the drawbacks of the prior art.

More specifically, the aim of the invention is that of providing a steering column video game controller increasing the game realism, and thus precision and adaptation to a given game, particularly for vehicle driving simulations.

One aim of the invention is particularly that of providing a steering column video game controller offering realistic suspension, acceleration and deceleration effects.

A further aim is that of providing, according to at least one embodiment, a steering column video game controller enabling the user thereof to improve their physical fitness in a fun way by generating exertion corresponding to the practice of a mechanical sport (car racing, for example) or some water sports (sea scooter racing, for example).

A further aim of the invention is that of providing, according to at least one embodiment, a steering column video game controller with a long service life and a high resistance to exertions applied by the user.

A further aim of the invention is that of providing, according to at least one embodiment, a steering column video game controller which is quiet and does not generate parasitic vibration (which would detract from the realism).

A further aim of the invention, according to at least one embodiment, is that of providing a steering column video game controller which is simple (including a small number of parts) and easy to assemble.

A further aim of the invention, according to at least one embodiment, is that of providing a steering column video game controller which is easy to transport and offers easier maintenance (after-sales support).

SUMMARY OF THE INVENTION

These aims, along with others which will emerge hereinafter, are achieved using a video game controller having a rotatably movable actuator with respect to a frame, so as to simulate control of the rotation and/or torque of a steering column of a simulated vehicle.

In other words, it consists of a video game controller which simulates the steering members of a simulated vehicle having a steering column. This controller, capable of generating output signals, comprises a frame and an actuator which simulates the portion of said steering members suitable for gripping and which engages with a steering column which is rotatably movable with respect to the fixed frame (in that it forms a game controller reference). It should be noted that the frame of the video game controller can rest or be attached on or to a supporting member, such as a table or a structure suggesting, for example, a cockpit.

According to a first embodiment of the invention, without servo control, said actuator is translatably mounted with respect to said fixed frame, on a predetermined movement range, between two end positions, using an assembly of at least two sliding parts with one or both sliding with respect to the other, one of said sliding parts being rigidly connected to said actuator and another of said sliding parts being rigidly connected to said fixed frame, a first of said sliding parts comprising at least one slot accessible by at least one opening wherein at least one penetrating portion of the second of said sliding parts moves along at least one distinct axis of the rotation movement axis of said actuator, the translation movement of said actuator being generated by electromagnetic means controlled by at least one electrical signal the characteristics whereof are dependent on a received command (said command may, for example, be a ramp or sine type movement instruction or a neutral position maintenance instruction), the first of said sliding parts comprising at least one winding through which said electrical signal passes or at least one magnet and the second of said sliding parts comprising at least one magnet or at least one winding respectively.

According to one particular embodiment, one of said sliding means comprises at least two windings.

Processing means, in the form of a microprocessor, control said electrical signal and thus control the direction, speed and amplitude or distance of said movement (provided that at least two windings are used by the second sliding part).

According to one embodiment, said slot is accessible by at least two openings.

This makes it possible to optimise the sliding of the sliding parts.

In one particular embodiment, the translation movement of said actuator is carried out along a separate axis from the rotation axis of said actuator.

In one alternative embodiment, said actuator is translatably mounted in relation to said frame along at least two directions.

For this purpose, at least two linear motors are used to obtain two boosts in different directions.

Advantageously, one of said sliding parts comprises at least one magnet arranged symmetrically with respect to the longitudinal axis (direction of Y axis) and the transverse axis (direction of X axis) of said sliding part.

This particular embodiment enables self-centering of the plate with respect to the base with no electrical power.

In one alternative embodiment, the controller comprises means for rotating said actuator with respect to said frame so as to simulate/reproduce at least one torque effect or a vibration effect.

Numerous force feedback effects are possible, for example: inertia, spring, blockage, acceleration, sudden movement (impact), etc.

Various vibration effects are also possible, and can particularly differ in terms of the amplitudes, durations and periods thereof.

The game software programmer selects the force feedback effect(s) according to the game scenario (for example: the scenario envisages an earthquake, potholes in a road surface, etc.) and player actions on the game (for example, the player has driven the simulated vehicle into a tree or has failed to avoid an obstacle).

The game requires the execution of the force feedback effect(s) and/or the vibration effects selected by the programmer for a particular scenario from a library of force feedback and vibration effects (for example, an effect mechanically requiring rapid movement of one of the sliding part in one direction, and a somewhat less rapid movement in an opposite direction, and movements reproducing vibrations and finally the immobility of said sliding part).

The microprocessor converts the effects sought by the programmer into at least one electrical signal with specific characteristics (for example, in the case of the shape of the signal: sine, ramp or square). The electromagnetic means generate and control the translation movement of one of the sliding parts with respect to the other sliding part. This control of said translation movement includes the direction of the movement, the amplitude of the movement (the stroke) and the movement speed.

In one particular embodiment, the rotation means comprise a rotary electric motor acting on the actuator via a gear and/or toothed belt system.

In one alternative, a "brushless" motor directly connected to the steering column (i.e. with no gear system) is used.

According to one particular aspect, said actuator is detachable from said frame.

According to one particular embodiment, the actuator belongs to the group comprising:
steering wheels;
handlebars;
helms;
yokes.

Advantageously, said controller comprises a movement sensor for measuring said actual translation movement and providing the data representing said movement to processing means.

According to a second, preferential, embodiment of the invention, in addition to that described above for the first embodiment, the invention comprises a sensor which is, for example, a variable linear resistor or a magnetic sensor measuring the position of a magnet. Said sensor provides, in real time, the data enabling said microprocessor to control said translation movement in real time, by determining the actual movement in real time (the actual position is measured directly but it is also possible to determine the direction, acceleration and actual speed of the movement) in real time.

It is thus possible to account for the effects caused for exertions generated by the player on the actuator (and thus on the steering column and on the sliding part rigidly connected thereto) and adjust the electrical signal if required.

For example, if the force feedback effect is immobility (i.e. a lack of translation movement of said actuator, steering column and sliding part), the player is liable to counter said immobility, once, with no servo control, the steering column is likely to move under the effect of the exertions generated by the player despite the electrical signal(s) used.

In this example, if the sensor measures a change of position while the microprocessor is executing an "immobility" instruction, then the microprocessor can adjust in real time each electrical signal to counter the player's exertions (for example, by increasing the electric voltage).

The translation movement control thus includes the control of the movement amplitude (including a zero movement distance), the direction thereof, the acceleration and movement speed, by at least one electrical signal the characteristics of which theoretically make it possible to obtain these movement settings, the verification of the actual execution of said settings and the adjustment of the movement if required. In this preferential embodiment, the movement is thus servo-controlled.

In other words, there are two ways to implement the invention:
the first, with no servo control, wherein the movement is controlled in an open loop, without determining the actual movement, thus not taking into account whether the user generates very significant exertions or not affecting the movement (for example the position or speed);
the second, with servo control, wherein the actual movement is measured in real time to adjust the electrical signal (including, for example, the voltage).

The translation movement can be controlled by a linear electric motor, said motor needing to comply with the characteristics described above, i.e. with the characteristics of sliding parts, winding(s) and magnet(s).

Said linear electric motor then comprises electromagnetic means and at least two sliding parts, and, said electromagnetic means can generate the translation movement of at least one of said sliding parts.

Preferentially, said guiding body is rigidly connected to said actuator and said guiding plate is rigidly connected to said frame. However, this may be reversed: the guiding body may be rigidly connected to said frame and, in this case, said guiding plate is thus rigidly connected to said actuator.

The steering column may be horizontal but preferentially the steering column is inclined with respect to the horizontal (the actuator is thus raised with respect to a horizontal position of the column). Inclining the steering column makes it possible to obtain more varied force feedback effects and retain the simplicity of the video game controller and limit the cost thereof.

In a further embodiment, the steering column may be horizontal but movable and guided in translation with respect to the frame along an inclined direction with respect to the horizontal.

Preferentially, the video game controller also uses means for rotational movement, referred to as torque and vibration effect means, of said actuator with respect to said frame so as to simulate/reproduce a torque effect (rotational force) and/or a vibration effect.

In this way, the steering column is boosted:

in translation by a force feedback and/or vibration system by means, for example, of an electromagnetic device acting on the steering column via an assembly of two sliding parts, including a translatable base whereon said column is rotatably mounted, the translation movement of the base being controlled by the electromagnetic means; and, in at least one embodiment, in rotation by a torque and vibration effect system by means, for example, of a rotary electric motor acting on the steering column via a gear and/or toothed belt system.

Such a video game controller can thus convert mechanical settings from the software into forces applied to the steering column, and thus to the actuator, along at least two axes.

In this way, in addition to the conventional torque and vibration effect system applied to the rotation of the column (and thus of the steering wheel or handlebars), at least one force feedback is simultaneously applied to the translation of the column by electromagnetic means to simulate, in particular, acceleration or deceleration effects and a suspension effect.

In other words, the controller according to the invention actuates the steering column in rotation and translation thus offering the user a realistic feel.

The steering column rotation and translation actuation means are controlled by:

the firmware according to the player actions on the game controller (on its levers, joysticks, paddles, knobs, etc.) and on any accessories thereof (pedal set comprising one or a plurality of pedals, separate gear shift box from the game controller, etc.), particularly according to the response curves measured on the pedals (acceleration, braking and/or clutch) and/or at the gear change on the steering wheel or on the gear shift box separate from the steering wheel;

the game software which, by incorporating an effect library on the respective actuation means controls the sought effects according to the contextual game data; and processing means.

The controller according to the invention uses a power stage which is linked with the processing means and which is capable of allocating the power supplying and controlling the steering column rotation and translation actuation means. This power stage may be integrated in the overall electronics controlling the motors, axes, knobs of the steering wheels, pedals and the gear shift box if applicable.

The controller according to the invention particularly provides the user with realistic suspension sensations by means of dynamic movement of the steering column over a short stroke. Such a suspension effect was obtained, in the prior art, using a cockpit mounted on cylinders, such a solution being however unsuitable for general public simulation at home.

The controller according to the invention further provides the user with acceleration sensations. For example, in a car race simulation, when the player places significant pressure on the acceleration pedal, the steering column moves along the axis A in the direction opposite the user, who is "pulled along by the steering wheel".

The controller according to the invention also provides the user with deceleration sensations, including impact sensations.

Finally, the controller according to the invention provides the user with vibration sensations.

The electromagnetic device according to the invention, controlled by the processing means (according to the firmware and the software), is powered by a conventional power source via the power stage and makes it possible to optimise the instructions from the game software (the reaction time of such a device being brief) compared for example to a pneumatic device particularly requiring a compressed air reserve. Moreover, the available force/space requirement ratio of such a solution is particularly advantageous.

The electromagnetic device according to the invention also offers the advantage of being compact and quiet.

The electromagnetic device according to the invention also offers the advantage of satisfactory power and a satisfactory service life. Given that the player will apply considerable force and that the steering wheel overhangs with respect to the frame, a tooth system (gears or rack) would be subject to premature wear and a risk of breakage (and would also be noisier).

The shape of the sliding parts ensures satisfactory guidance of these parts when they are assembled.

Indeed, a first of the sliding parts comprises a slot which is accessible by two openings and allows the penetrating portion of the second of the sliding parts to cross the first of the sliding parts.

Moreover, this assembly ensures the robustness of the sliding parts, enabling the use thereof in various locations for various uses each offering boosting of the steering column in at least one direction with respect to the axis A, particularly the longitudinal direction (translation of one of the sliding parts along a direction substantially parallel to the axis A), the transverse direction (translation of one of the sliding parts along a direction substantially transverse to the axis A, to simulate lateral effects), and the vertical direction (translation of one of the sliding parts along a direction substantially vertical to the axis A, to simulate top or bottom effects).

The invention also offers the advantage of being precise and controllable in real time. Indeed, the electromagnetic device enables a two-way movement (for example: forwards or reverse), a return to neutral, and a dynamic adjustment of the steering column movement speed.

In one particular embodiment, the electromagnetic device comprises at least two windings for adjusting the amplitude of the movement of the steering column and lock same in equilibrium as required (the steering column can be locked in translation not only in the neutral position and in the end position but also at any point between the end positions).

Only one winding only allows the transition from one end position to the other by reversing the current in the winding. An electromagnetic device with a single winding is not sufficient to adjust the movement speed effectively during the translation between two end positions (or abutments). Consequently, an electromagnetic device with a single winding only enables limited effects, restricting same to the production of vibration or impact effects.

More than two windings may be used but, in this case, determining and adjusting the characteristics of the electric signals corresponding to the effects to be produced in real time, is more complex unless symmetry is retained.

Regarding the translation of the sliding parts along an axis which is separate from the rotation axis of the actuator, the structure of the linear electric motor allows the motor to be independent from the rotation axis of the actuator. The robust and compact characteristics thereof allow the motor to be positioned in different places according to the effects to be offered to the user (the motor could for example be positioned perpendicularly to the steering column in order to maximise suspension effects, whereas if the parts slide along the rotation axis, it is the acceleration/deceleration effects which are privileged).

In one particular embodiment of the invention, said controller comprises at least one stress sensor to measure the forces applied to said actuator or to said steering column.

In a further particular embodiment of the invention, said second sliding part comprises a penetrating portion wherein the width is less than the length of said openings of said first sliding part and two portions situated at the respective ends of the portion wherein the width is greater than the length of said openings.

In one particular embodiment, said second sliding part comprises at least one prolongation in a direction perpendicular to the longitudinal axis of the penetrating portion.

Preferentially, said at least one prolongation is movable with respect to a corresponding opening provided in said first sliding part.

Advantageously, the first of said sliding parts comprises two subassemblies assembled together.

Preferentially, each of said subassemblies comprises at least one winding.

As mentioned above, this enables two-way movement control. It is possible to lock the movement as required and the effects have the required amplitude.

BRIEF DESCRIPTION OF THE DRAWINGS

Further features and advantages of the invention will emerge more clearly on reading the following description of a preferential embodiment, given merely as an illustrative and non-limitative example, and the appended figures, wherein:

FIG. 13 is a perspective view of the base in FIG. 10 without the magnet support plate.

DETAILED DESCRIPTION

General Principle

Steering column video game controllers comprise an actuator which generally consists of handlebars or a steering wheel enabling the user to vary the trajectory of the simulated vehicle.

Obviously, other types of actuators may be envisaged, for example to simulate the control of a ship, aircraft, spaceship, etc.

In a known manner, the rotation of the steering column may be boosted by a torque and vibration effect system making it possible to create torque effects and/or vibration effects around the axis of rotation of the video game controller.

The principle of the invention consists of creating new force feedback axes on the game controllers with at least one translation of the steering column thus offering new force feedback effects and more realistic simulations.

The first and second force feedback effects systems each provide varied effects (inertia, blockage, shock absorption, impact, vibration sensations, etc.).

In the particular embodiment described hereinafter, this translation is carried out along the axis of the column or along a close axis via an assembly of two sliding parts with one sliding with respect to the other and an electromagnetic device thus simulating suspension, acceleration and/or deceleration effects, in particular.

Detailed Description of a Particular Embodiment

In the embodiment described hereinafter, the actuator is a steering wheel (such as a touring vehicle steering wheel) which is detachable from a frame.

Figure 1:
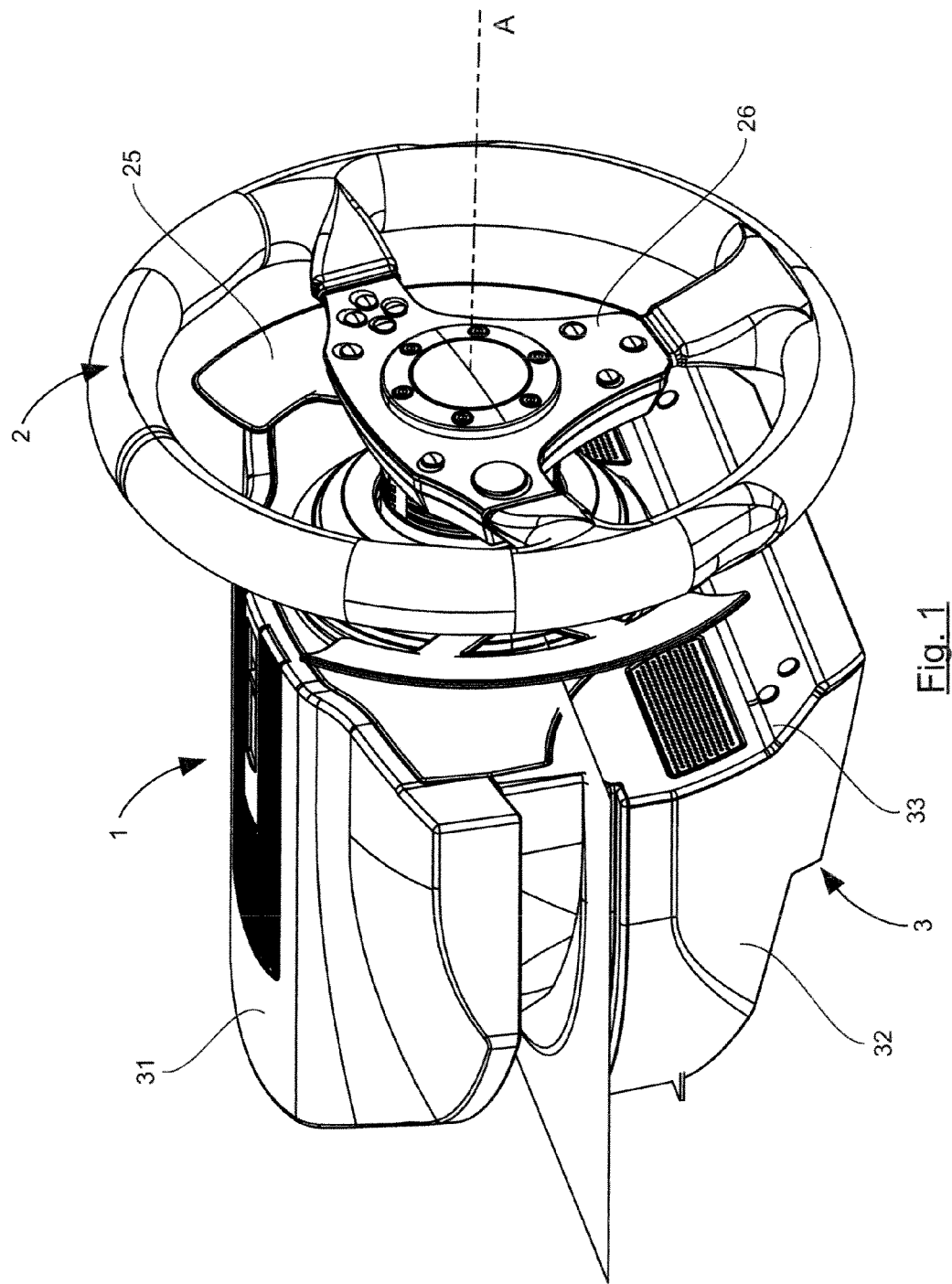
FIG. 1 is a perspective view of the video game controller, and more specifically of an example of a steering wheel controller for controlling a video game liable to implement the invention.

FIG. 1 is a perspective view of an example of a video game controller according to the invention. This controller 1 comprises an actuator 2, in the form of a rotatably movable steering wheel with respect to a frame 3 around an axis A of rotation, the frame 3 being suitable for being mounted on a supporting member (not represented), said supporting member being optionally fixed. This frame 3 comprises an upper shell 31 assembled in a removable manner with a lower shell 32 and with a front face 33. The lower shell 32 of the frame 3 provides the optionally reversible link or attachment of the controller 1 with a supporting member such as a table or a worktop or a cockpit. The game controller 1 may be associated with pedals and, if the gears are not changed on the steering wheel, with a separate gear shift box from the steering wheel.

FIG. 1 particularly shows the control knobs 26 and gear shift paddles 25 arranged on the actuator 2. The controller 1 comprises an attachment system which allows the actuator 2 to be fixed and locked in a reversible manner on the frame 3 in order to enable the transmission of the rotation movement from the actuator 2 to the steering column which, in this embodiment, is the shaft 31 (seen in FIGS. 2 to 5). Numerous reversible attachment means may naturally be used, without leaving the scope of the invention.

In one simplified embodiment, it is also possible to use mere force-fitting of the steering wheel in the supporting member thereof.

Figure 2:
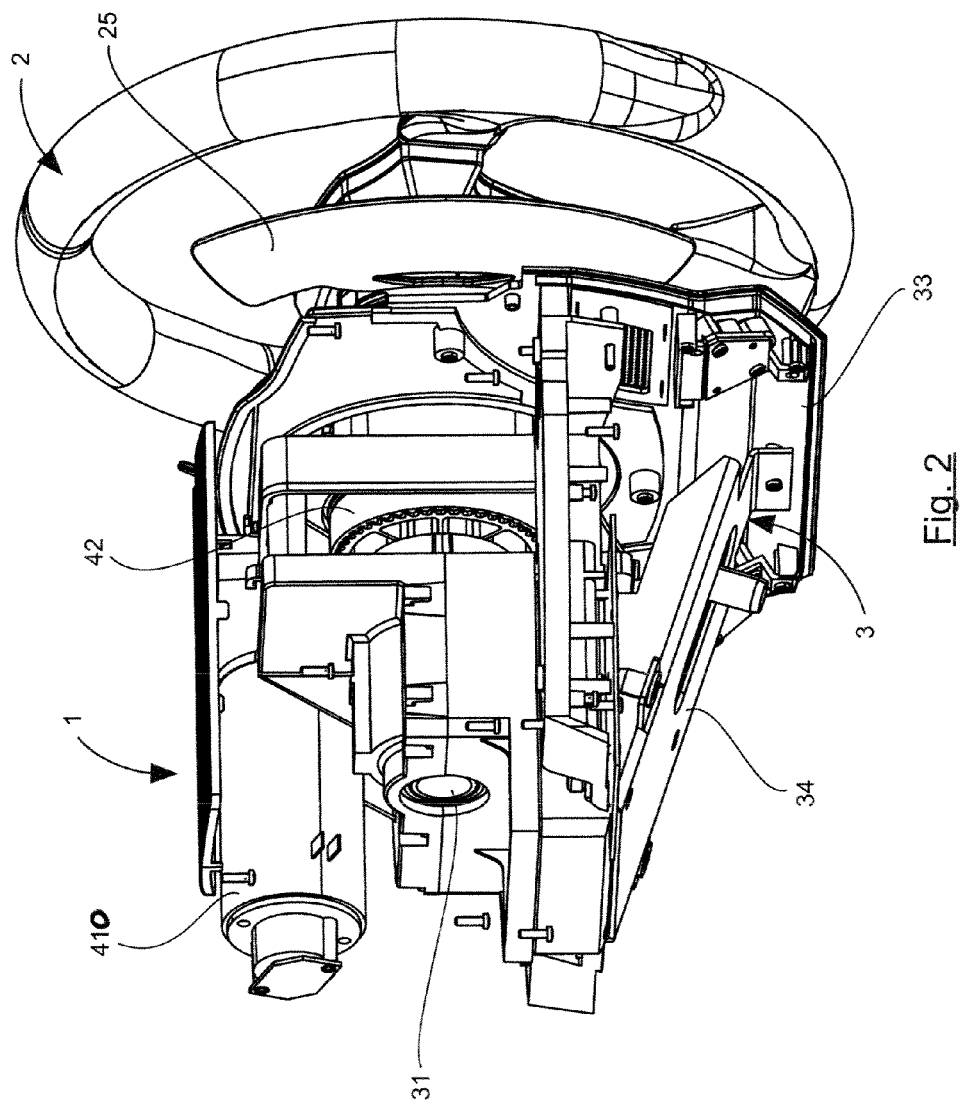
FIG. 2 is a perspective view of the inside of the video game controller according to the invention.
Figure 3:
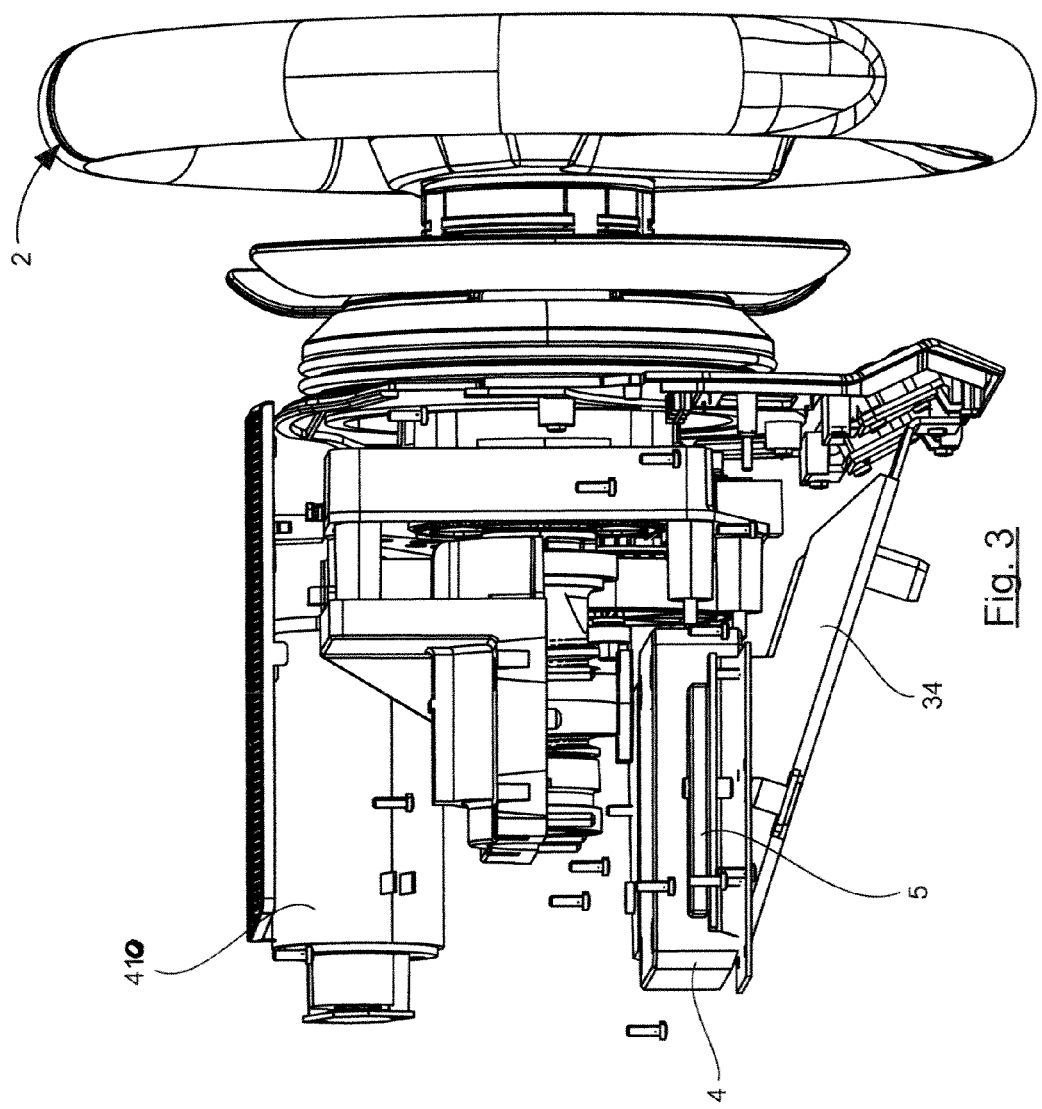
FIG. 3 is a side view of the translation force feedback means of the actuator of the video game controller according to the invention.
Figure 6:
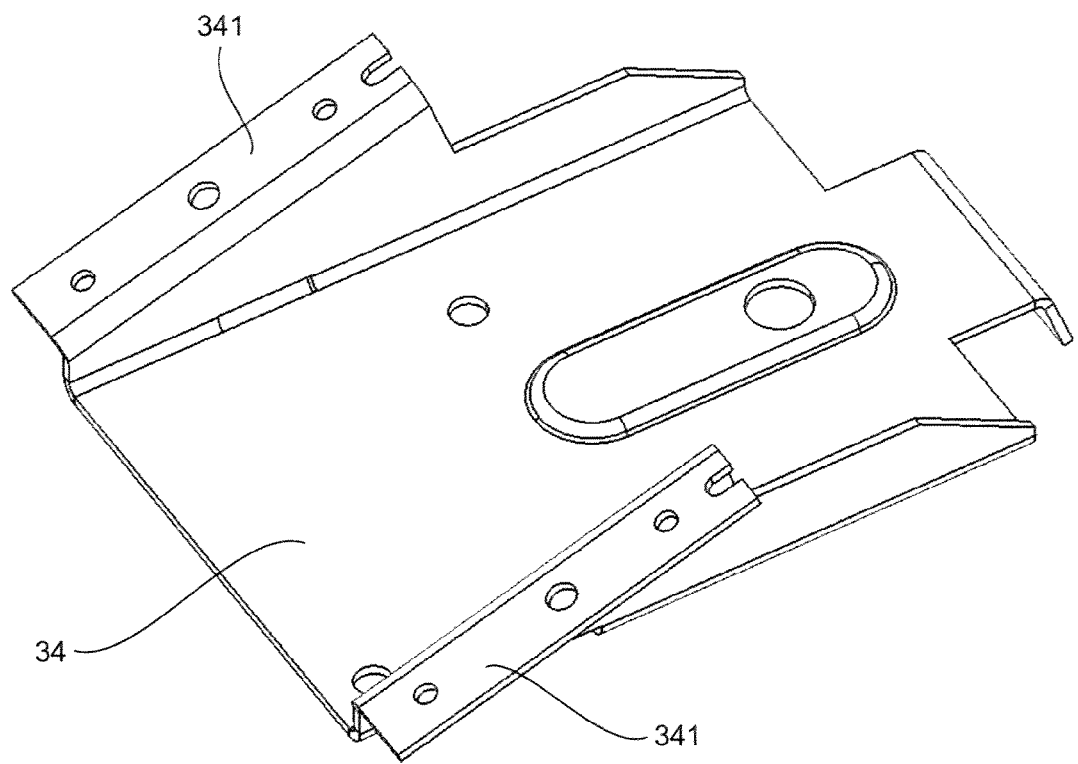
FIG. 6 is a perspective view of a plate of the frame of the video game controller according to the invention.

FIGS. 2 and 3 illustrate, via a perspective and side view respectively, the inside of the controller 1 once the upper shell 31 and the lower shell 32 have been removed. This figure shows the frame 3 comprising the front face 33 connected in a fixed manner to a plate 34 (FIG. 6), the shaft 31 (forming the steering column of the controller 1) to which the actuator 2 is connected. The shaft 31 consists of a single part but it could consist of a plurality of parts attached to each other. The shaft 31 (or steering column 31) is rigidly connected to the actuator 2, and thus moves in rotation around the axis A similarly to the actuator 2.

The rotation of the steering column 31 is boosted by a first system, referred to as a torque and vibration effect system by means, for example, of a rotary electric motor 410 acting on the steering column 31 via a gear and/or toothed belt system. In this case, a large diameter gear 42 (for precision) is attached coaxially to the steering column 31. This gear 42 mechanically receives (via a gear and/or wheel mechanism and toothed belts) the forces applied by the electric motor 410 actuated according to torque effects or vibration effect(s) implemented by the video game. The gear 42, and thus the steering column 31 and the actuator 2, pivots or stops the rotation thereof around the axis A under the action of the electric motor 410. For example, it can return the actuator 2 to the neutral position, or block the rotation of the steering column 31, cause the rotation of the steering column 31, cause jerks in the rotation of the steering column 31, etc.

According to the invention, the steering column 31, and thus the steering wheel 2, is boosted in translation by a second system, referred to as the force feedback system.

For this purpose, the steering wheel 2 of the video game controller 1 is translatably mounted with respect to the fixed frame 3 along an axis of rotation A thereof or along an axis close to (and thus separate from) said axis A, over a predetermined movement range, using an assembly of two sliding parts, with one sliding with respect to the other. The translation movement of the steering wheel 2 is controlled by an electromagnetic device, which will be described in more detail hereinafter.

More specifically, the electromagnetic device controls the translation movement of a movable guiding body 4 with respect to the frame 3 and whereon the steering column 31 and the steering wheel 2 are rigidly connected. This guiding body 4 slides with respect to a guiding plate 5 which is rigidly connected to the fixed frame 3.

The steering column is not horizontal but inclined with respect to the horizontal to enable the player to experience the force feedback effects in four directions (up, down, forward, reverse) via only one electromagnetic device, a guiding body 4 and a guiding plate 5.

The steering column has an angle of eighteen degrees with respect to the horizontal (in other words, 18° with respect to a plane supporting member to which the video game controller is attached).

The tilt with respect to the horizontal enables the player to experience substantially vertical effects (up-down with respect to user), particularly a suspension effect, without using purely vertical translation of the steering column with respect to a plane surface to which the video game controller is fixed (thus in this case in a simple and at least cost manner).

Despite this eighteen degree tilt with respect to the horizontal, the essentially longitudinal direction of the steering column enables the player to experience substantially horizontal effects (more specifically, longitudinal, thus forward-reverse with respect to the user), particularly acceleration and deceleration effects.

Consequently, the steering column 31 and the steering wheel 2 are movable in rotation and translation with respect to the frame 3, making it possible to offer a new force feedback and vibration axis obtained in translation in addition to the torque and vibration effect axis obtained in rotation. In terms of the substantially vertical force feedback effects and the substantially horizontal and longitudinal force feedback effects (in the embodiment in FIGS. 2 to 5), the simulation is more natural, more realistic, than that enabled by a torque and vibration effect system.

The technique according to the invention thus makes it possible to increase the realism of the game.

Indeed, a translation of the steering column along a roughly longitudinal direction (forward, reverse with respect to the user) enables the user to particularly experience accelerations/decelerations of the simulated vehicle. A translation of the steering column along an inclined direction with respect to the horizontal enables the player to particularly experience a suspension effect. In respect of the suspension effect alone, the translation of the steering column along an inclined direction with respect to the horizontal can be advantageously, in terms of realism, replaced by a rotation of the steering column along a substantially orthogonal direction with respect to the supporting member surface whereon the game controller frame is fixed or rests.

The translation of the steering column along an inclined direction with respect to the horizontal can also be replaced (but with a less realistic effect for the user) by a rotation of the steering column about an axis that is transverse and orthogonal with respect to the axis A.

In other words, a rotation also makes it possible to produce a suspension effect (the first end of the column, that opposite the user, being in a ball joint link with respect to the frame and the second end being in a vertical slide rail link with respect to the frame, and a linear motor raising/lowering said second end, such that the actuator, i.e. the portion suitable for gripping, is raised or lowered).

Figure 7:
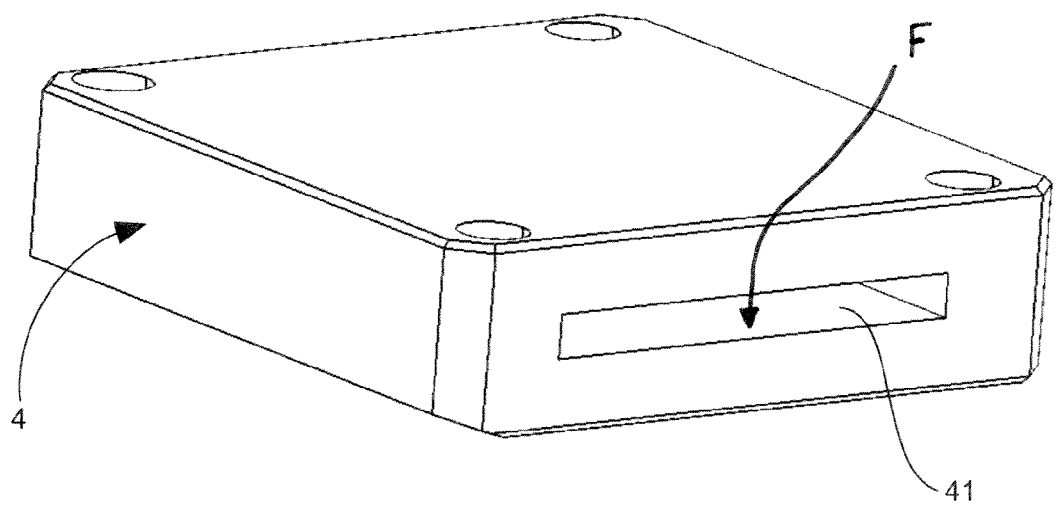
FIG. 7 is a perspective view of an embodiment of a base of the steering column of the video game controller according to the invention.

FIG. 7 is a perspective view of the guiding body in the form of a substantially parallelepiped base 4 comprising a slot (or housing) accessible via two rectangular openings 41 situated on two opposite faces (or sides) of the base 4.

The dimensions of the base 4 may be different according to the required stroke length for the translation movement. The length of the stroke (thus the dimensions of the base and the number and characteristics of the winding) is selected according to the maximum amplitude of the effects to be offered to the user and the number of successive effects to be potentially offered as a user sensation during the shift between a neutral position and an end position. It is understood that the shorter the stroke (of the base 4 with respect to the plate), the lower the number of speed changes (of the actuator movement) in the same direction that the user is able to perceive.

According to one alternative embodiment, a device for increasing (amplifying) the stroke of the sliding parts consisting for example of a gear(s) and rack(s) assembly, or a screw(s) and nut(s) system, or a connecting rod(s), or cam(s) and shaft(s), mechanism is added.

The base 4 consists of two subassemblies 42A, 42B (FIG. 9A) assembled by screwing together.

According to other alternative embodiments, the slot of the base is accessible by more than two openings and the shape thereof corresponds to a space adapted to house the penetrating portion of the magnet support plate with play, so that the base can move in translation with respect to the magnet support plate (or vice-versa).

One of the additional openings can thus be located on a face situated in an orthogonal plane with respect to the planes wherein the other faces are situated, such that a prolongation can emerge from each of the additional openings and provide an additional bearing point.

The magnet support plate penetrates into the base according to a direction which is approximately perpendicular to the rotation axis of the steering column. Indeed, the magnet support plate crosses the base, intersecting same perpendicularly according to the larger dimension thereof (the magnet support plate emerging from the base along the y direction).

Figure 4:
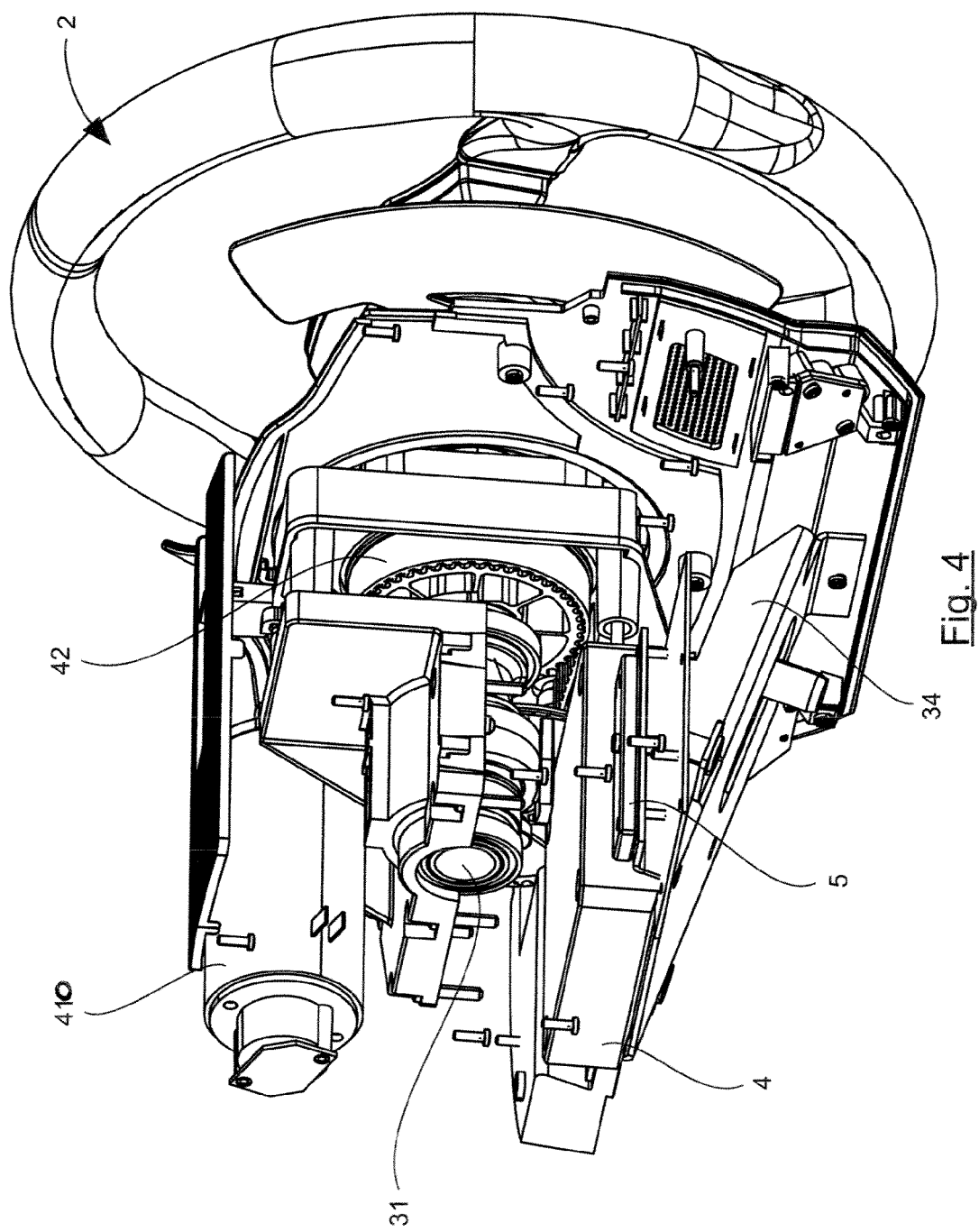
FIG. 4 is a perspective view of the translation force feedback means of the actuator of the video game controller according to the invention.
Figure 5:
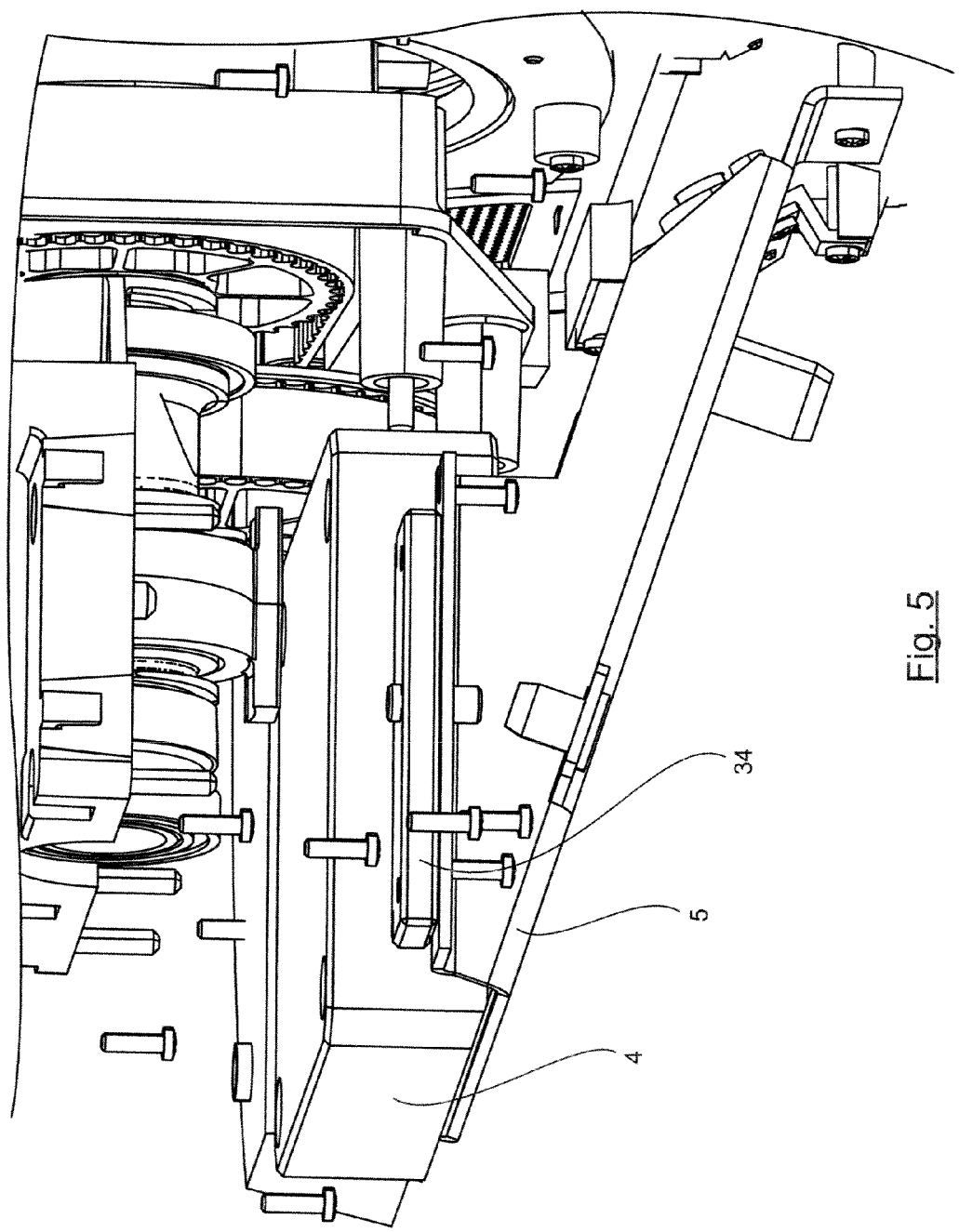
FIG. 5 is a detailed view of the translation force feedback means of the actuator of the video game controller according to the invention.
Figure 8:
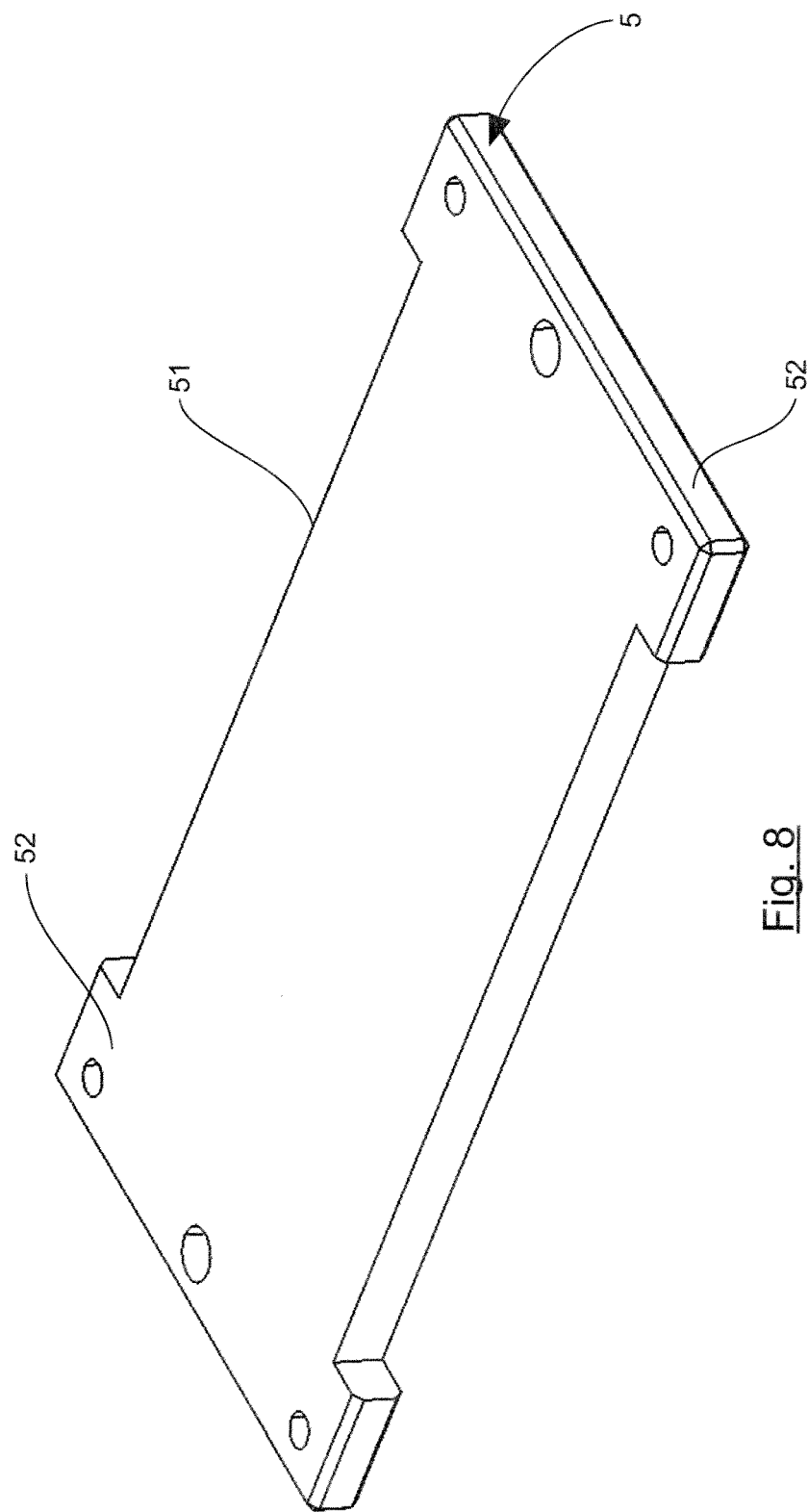
FIG. 8 is a perspective view of an embodiment of a magnet support plate.

The guiding plate in the form of a magnet support plate 5, illustrated in perspective in FIG. 8, comprises at least one magnet (not represented) and comprises a penetrating part or portion 51 wherein the width is less than the length of the opening 41 of the base 4 and two portions 52 situated at the respective ends of the portion 51 wherein the length is greater than the length of the opening 41 of the base 4. The penetrating portion 51 of the magnet support plate 5 is intended to be housed in the housing of the base 4, as illustrated in FIGS. 3 to 5. This magnet support plate 5 is furthermore rigidly connected (by screwing) via the portions 52 to the tabs 341 of the plate 34.

Figure 9A:
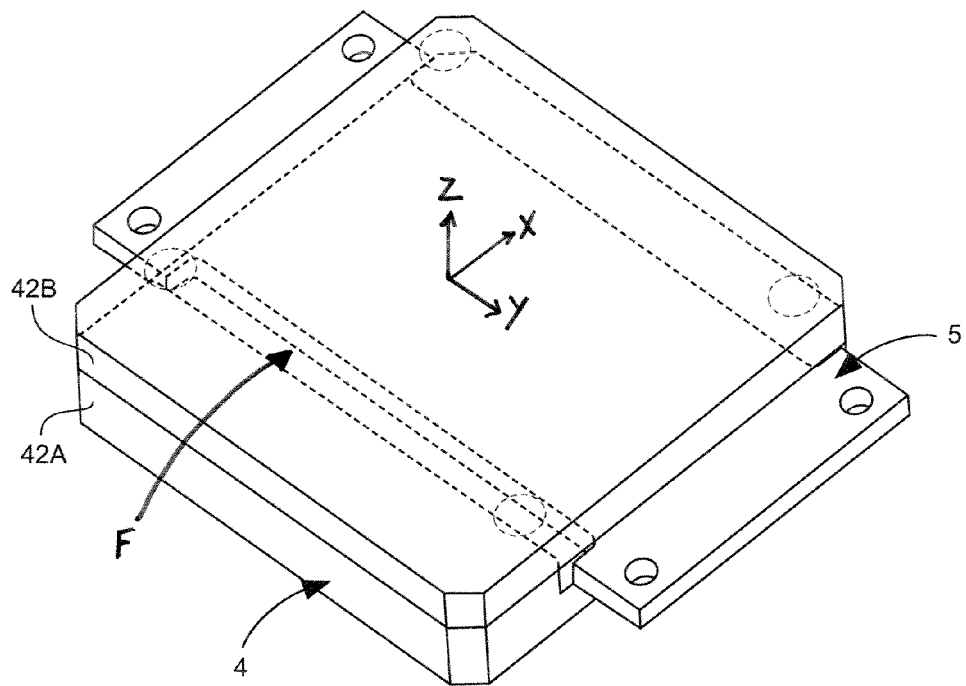
FIGS. 9A and 9B are perspective views illustrating the movement of the base in relation to the magnet support plate according to one embodiment.
Figure 9B:
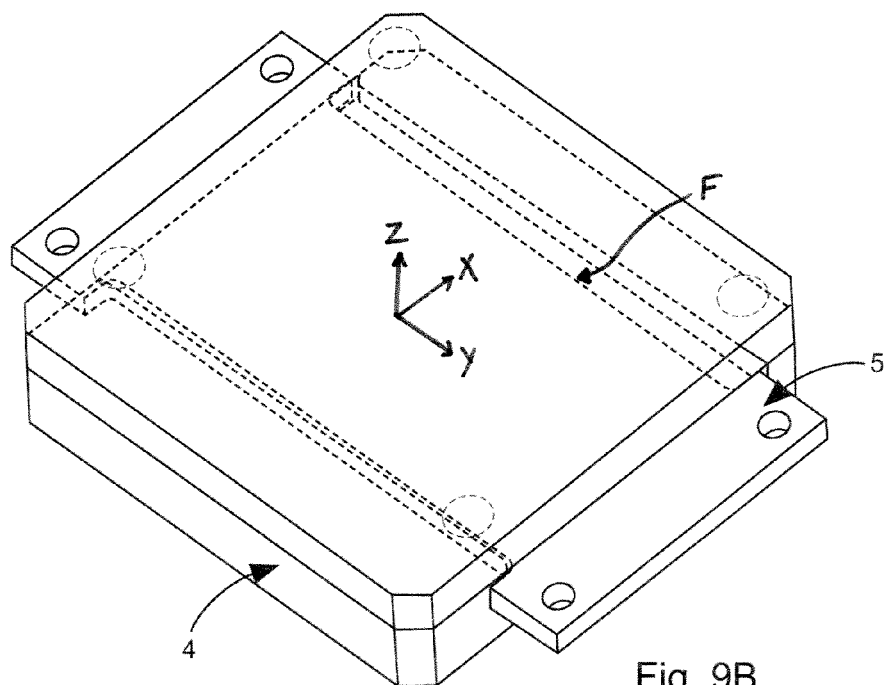

The base 4 comprises at least one winding (not represented) which, according to the electrical signal travelling through same, causes the movement of the base 4 with respect to the magnet support plate 5, as illustrated in FIGS. 9A and 9B. It is easily understood that the direction, stroke (or range) and speed of movement of the base 4, and thus of the steering column 31, are dependent on the electrical signal travelling through the winding(s).

It is also understood that, if a plurality of windings are present, an identical or different electric signal may pass through each winding. Using two windings with identical characteristics, a first electric signal passing through the first winding applies a first electromagnetic force, and a second electric signal passing through the second winding applies a second electromagnetic force. This second electromagnetic force may be applied in the same direction, either in a direction opposite the direction of the first force, or in the same direction.

Furthermore, this second electromagnetic force may be weaker, equal or stronger than the first electromagnetic force. It is thus understood that, by adjusting the characteristics of the first and second electric signal, it is possible to set the base 4 in equilibrium with respect to the magnet support plate 5. It is possible to lock same with respect to the other not only at the end positions (i.e. abutments) of the movement range of the base 4 with respect to the magnet support plate 5, but also at any point between these end positions.

It is also possible to adjust the amplitude of the movement (or movement distance), including for obtaining a zero movement amplitude from an equilibrium position between the end positions.

With a single winding, it is not possible to stop the movement of the base 4 between two positions (a single winding offers an "all or nothing" configuration).

For these reasons, an electromagnetic device with a single winding only allows limited effects restricting the application thereof to the production of vibration or shock effects, excluding more elaborate effects such as, for example, suspension, acceleration and deceleration effects.

One type of suspension effect consists of an oscillating movement between two end positions which are not reached, the amplitude whereof declines over time and the oscillation whereof is carried out about a fixed equilibrium position. Another type of suspension effect consists of an oscillating movements between two end positions which are not reached, the amplitude whereof declines over time and the oscillation whereof is carried out about a movable equilibrium position. There are other types of suspension effect.

One type of acceleration effect consists of a linear movement (increase in amplitude) in a single direction the force (or intensity) whereof increases regularly over time between two equilibrium positions. Another type of acceleration effect consists of a linear movement in one direction, the force and speed whereof increase between two equilibrium positions. There are other types of acceleration effect.

Elaborate (or complex) effects differ from each other and should be suitable for succeeding each other. For example, an impact effect is followed by a suspension effect or an acceleration effect is followed by an impact effect.

It is thus understood that it is preferable to use an electromagnetic device with a plurality of windings since, if the end position has already been reached, some effects cannot be carried out in succession.

Furthermore, an electromagnetic device with a single winding does not provide a neutral position (whereas two windings generating opposite forces can keep the base 4 in equilibrium in a neutral position between the ends (or end positions) of the movement stroke or range of the base 4).

Therefore, with two windings (or coils) generating opposite forces, it is possible to increase the resultant force of the magnets already tending to return the base 4 to the neutral position when no current passes through the windings, to hold the base in the neutral position (such that it is impossible for the user to apply sufficient exertions to breach a neutral locking position instruction). With two windings, it is also possible to reassign a neutral position to the base 4 which is separate from the neutral position obtained when no current passes through the coils.

The use of at least two windings enables actual two-way translation movement control. This particularly makes it possible to adjust the intensity of the effects and thus improve the realism of the simulation.

Moreover, two windings generating forces in the same direction make it possible to increase the power provided by the electromagnetic device for some extreme cases.

FIGS. 9A and 9B show the movement of the base 4 with respect to the magnet support plate 5 along the x axis of the reference (x, y, z).

In an alternative embodiment, the base 4 can also move along the y and/or z axis.

In other words, the base 4 can move with respect to the magnet support plate 5 along one or more of the x, y and z axes.

The respective position of the guiding body 4 and the magnet support plate 5 is magnetically centred. More specifically, the magnet(s) of the magnet support plate 5 centre the guiding body 4 with respect to the magnet support plate 5 when no current passes through the winding (said guiding body is then in the neutral position or idle position). Consequently, if no electrical signal passes through the winding, the magnet(s) apply a resultant force which moves the guiding body 4 (and thus the actuator 2, the steering column 31, and more generally all the parts rigidly connected in translation to the guiding body) to the neutral position.

The winding preferably consists of two coils (as described hereinafter) positioned on either side of the magnet support plate 5 and each capable of applying a force in the opposite direction to reinforce the centering of the guiding body 4 such that it cannot move even under the action of exertions applied by the user, it being understood that the forces applied by each coil to hold the guiding body 4 in the neutral position are not necessarily equal due to the exertions applied by the user in particular.

An electrical signal is only required to control the movement of the guiding body 4, including to keep same in the neutral position despite a substantially longitudinal and significant force applied by the player on the actuator 2 (and thus indirectly applied to the steering column 31 and the guiding body 4).

Furthermore, the axis of translation movement of the steering column 31 is dependent on the tilt of the base 4, and thus of the plate 34. It will be possible to assemble these parts such that the axis of movement correspond to the axis A of rotation of the steering column, or is parallel with said axis A, or is offset with respect to said axis A.

In another embodiment, it is also possible to assemble these parts to obtain translation of the steering column and thus the actuator 2 in an oblique (i.e. inclined with respect to the horizontal) direction optionally separate from the tilt of the steering column.

The tilt angle of the base 4 may first be dependent on the direction of the axis A (i.e. the tilt thereof with respect to the horizontal) and the effects sought. It is then possible to deflect a force applied by the translation of the base 4 in a different direction to that of the movement of the base 4 (even if, in this embodiment, the optimum is a direction parallel with the axis A). For example, it would be possible to offset by an angle of thirty degrees or more.

The force feedback system used to boost the steering column at least in translation may comprise one or a plurality of linear electric motors. The linear electric motors may be positioned in different ways, as required. For example, if it is desired to increase the suspension effect, it is possible to position a linear electric motor to raise/lower the steering column. If it is desired to create lateral force feedback effects, it is possible to position a linear electric motor to push/pull the steering column to the left or right with respect to the player.

The force feedback system used to boost the steering column at least in translation may comprise at least one movement sensor. In particular, a movement sensor C may be borne by the guiding body 4 and is represented in FIGS. 10 and 13.

The movement sensor C is, in this embodiment, a linear magnetic sensor making a differential measurement of the magnetic field variations to acquire the data corresponding to the movement of the guiding body 4 with respect to at least one magnet supported by the guiding plate 5. Such a sensor offers very precise measurement.

A microprocessor (not represented) controls said electric signal and thus controls the direction, distance and speed of said movement. Said magnetic sensor is connected to said microprocessor which processes the data received from said sensor. Said microprocessor adjusts said electrical signal in real time according to the data received from said sensor.

Figure 10:
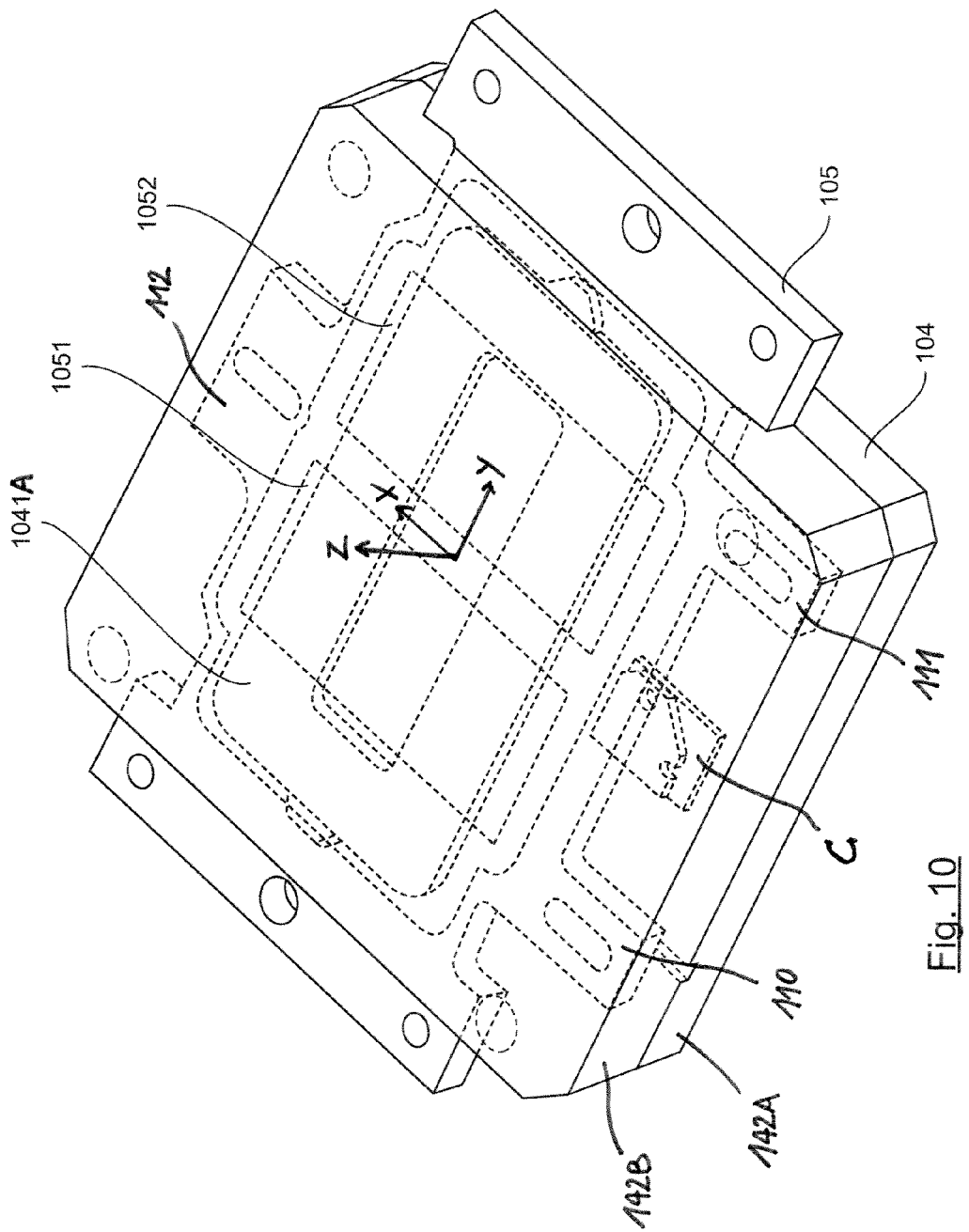
FIG. 10 is a transparency view of the base and the magnet support plate according to a further embodiment.

FIG. 10 is a transparency view of the base of the guiding body 104 and the magnetic support plate 105 according to a further embodiment. The two magnets 1051, 1052 arranged on the plate 105 and the coil 1041A of the guiding body 104 can be seen.

The two magnets 1051, 1052 each have a rectangular shape and are arranged symmetrically with respect to the longitudinal axis (direction of the y axis) and the transverse axis (direction of the x axis) of the magnet support plate. Each magnet can be replaced by two magnets (or more) to facilitate the positioning thereof on the magnet support plate. Preferably, the total number of magnets is a multiple of two and said magnets are neodymium magnets.

In the neutral position, the guiding plate 105 extends in a median fashion in a plane (x, y), considering the intersection of the x, y and z directions to be in the centre of the plate (the centre of the plate consisting of the coordinates x=0, y=0 and z=0).

The magnet support plate 105 is positioned between the coil 1041A which is above said plate and the coil 1041B (represented in FIG. 12) which is below said plate. The coils 1041A and 1041B are thus arranged symmetrically with respect to the magnet support plate 105.

The coils 1041A and 1041B each have an identical flat shape (the coils are thus preferably plane) and extend along the y direction (orthogonal with respect to the x direction).

The centre of the coils 1041A and 1041B is substantially aligned with the centre of the plate when no electric signal is passing through the winding (i.e. in the neutral position corresponding to the absence of any electric signal).

The movement sensor C arranged on the guiding body 4 can also be seen.

Figure 11:
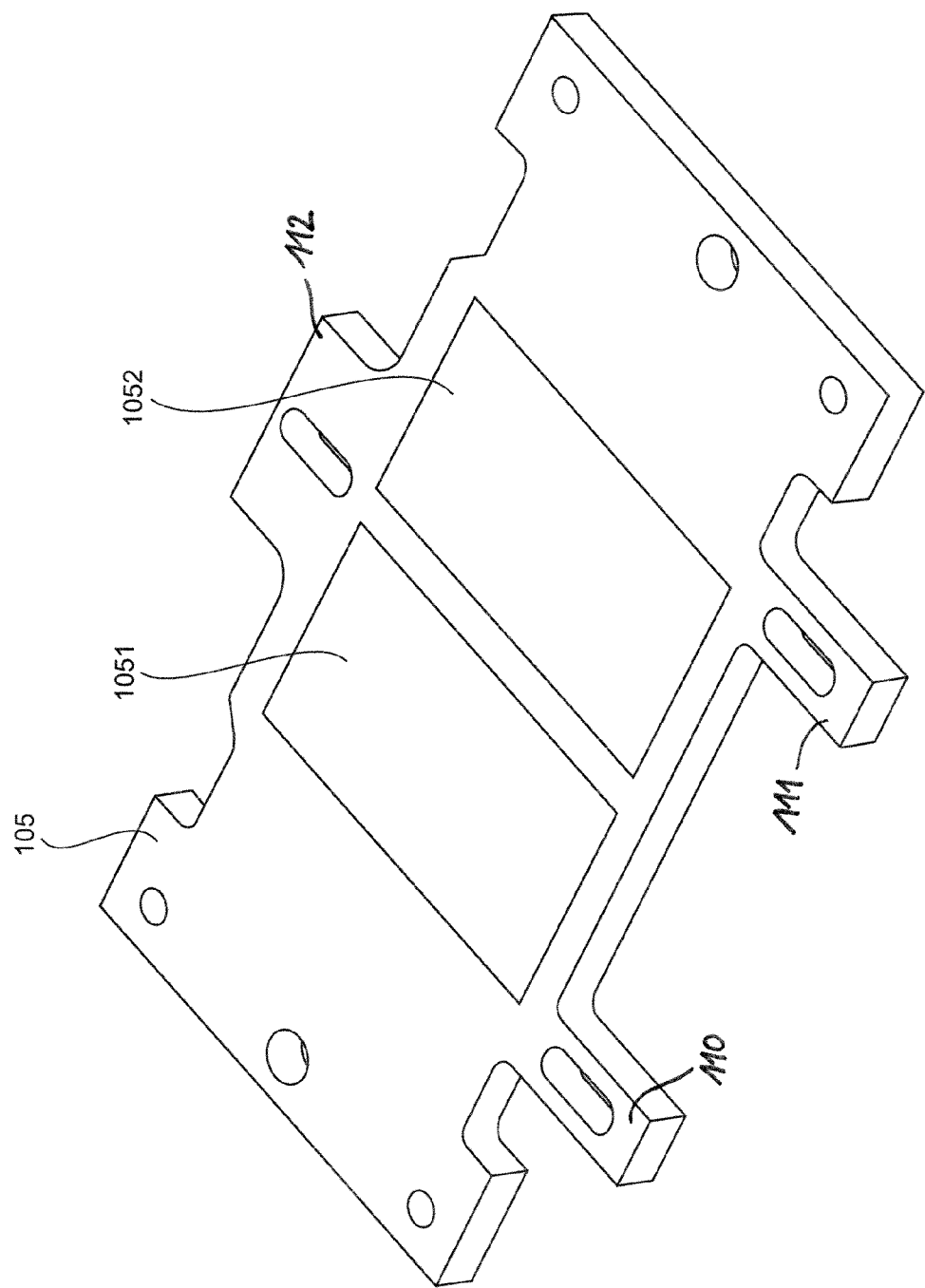
FIG. 11 is a perspective view of the plate in FIG. 10 showing the magnets.

FIG. 11 is a perspective view of the plate 105 in FIG. 10 showing the magnets 1051, 1052. The shape of the magnet support plate, plate 105 in this embodiment, is optimised for superior guiding, greater robustness (particularly useful when the sliding parts operate with overhang). Indeed the plate 105 comprises three prolongations 110, 111, 112 each comprising an oblong opening intended to engage with a stud formed in the guiding body 104 (the studs pass through the oblong openings, they consist of two male and female parts which fit together when top part 142B of the base 104 and bottom part 142A of the base 104 shown in FIG. 13 are assembled.

In this example, two first prolongations 110, 111 extend transversally (i.e. extend in the direction of movement x of the sliding parts) on one side of the penetrating portion of the plate 105 and a third prolongation 112 extends transversally (direction of the X axis) on the other side of the plate. The first two prolongations are far apart and the third is wider than the first two. Each of the prolongations slides in a corresponding opening provided in the guiding body 104 (these openings are not illustrated in FIG. 10 for the sake of clarity, only the openings 130 and 131 being illustrated in FIG. 13).

Figure 12:
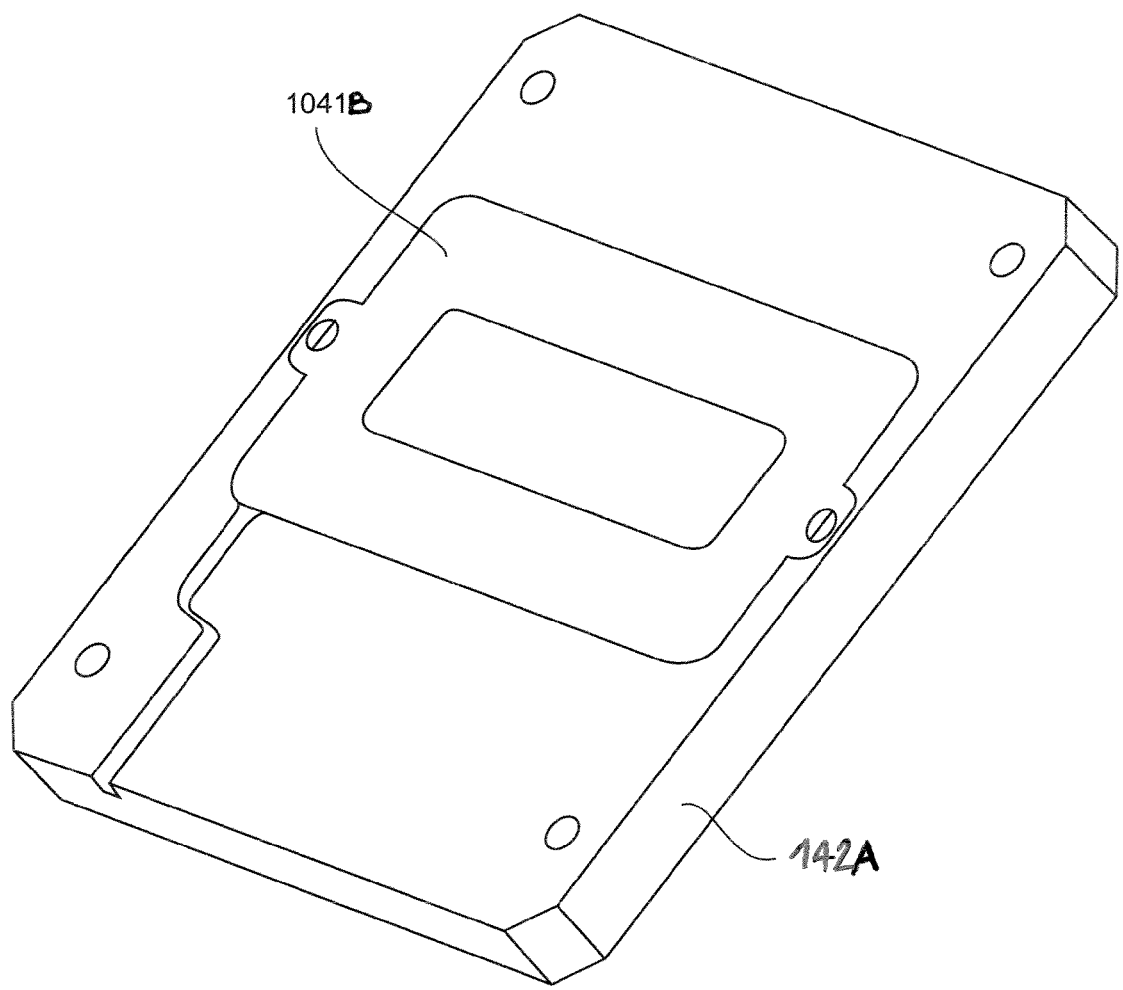
FIG. 12 is a perspective view of a portion of the base in FIG. 10 showing the winding rigidly connected to said portion.

FIG. 12 is a perspective view of a bottom portion 142A of the guiding body 104 in FIG. 10 showing the bottom coil 1041B.

FIG. 13 is a perspective view of the guiding body 104 in FIG. 10 without the magnet support plate 105. The movement sensor C can also be seen, as well as the opening 141 (the corresponding opening on the opposite part of the base 104 is not illustrated) and the openings 130, 131 which allow for an optimised guidance of the movement of the base 104 (without detracting from the compact design of the base 104 or complicating the mounting thereof in the video game controller).

It is to be noted that the prolongations 110, 111, 112 of the plate 105 move in the corresponding openings of the base 104 without necessarily coming out of these openings (in particular in the end positions of the base).

Alternative Embodiments

In one alternative of the embodiment described above, the guiding body 4 may be rigidly connected to the fixed frame 3 and the guiding plate 5 may be rigidly connected to the actuator 2.

In a further embodiment, the steering column 31 (and axis A) may be substantially horizontal.

In the embodiment in FIGS. 2 to 5, the guiding body 4 is flat on the plate 34. In a further embodiment, the guiding body 4 is on the edge thereof (in other words, with respect to FIGS.

3 to 5, the guiding body 4 (and the magnet support plate 5) pivots by ninety degrees about an axis substantially parallel to the axis A).

In the embodiment in FIGS. 2 to 5, the pair of sliding parts 4 and 5 is positioned such that the direction of translation of one of these parts (the sliding movable part) is substantially parallel with the axis A (to particularly simulate the accelerations or decelerations of the simulated vehicle in a substantially horizontal direction with respect to the simulated vehicle or at least partially frontal or rear impacts).

In a further embodiment of the invention, the direction of translation of the steering column with respect to the frame is more significantly inclined with respect to the horizontal (this translation direction may be different to the direction of axis A, it may particularly be more inclined to accentuate the suspension effect). Preferably, the pair of sliding parts 4 and 5 is positioned such that the direction of translation of one of these parts (the sliding movable part) is substantially parallel with the direction of translation of the steering column, thus inclined with respect to the horizontal. In this embodiment, translation of the steering column and thus of the actuator 2 is obtained in an oblique (i.e. inclined with respect to the horizontal) direction, such direction optionally separate from the tilt of the steering column. This oblique direction makes it possible to simulate at least partially horizontal effects, particularly accelerations or decelerations of the simulated vehicle in a substantially horizontal direction with respect to the simulated vehicle or at least partially frontal or rear impacts, but also at least partially vertical effects, particularly a suspension effect.

In a further embodiment of the invention, the sliding parts 4 and 5 were withdrawn and are replaced by a pair of sliding parts identical (in the operation thereof, but not necessarily in the dimensions, magnet and winding characteristics thereof) to parts 4 and 5 but they are positioned such that the direction of translation of the replacement sliding movable part is substantially perpendicular to the axis A (i.e. a substantially vertical translation with respect to the user to particularly simulate a suspension effect or accelerations or decelerations of the simulated vehicle in a substantially vertical direction with respect to the simulated vehicle or impacts on or under the simulated vehicle). In this case, the steering column 31 (and thus the actuator 2) is raised or lowered by translation or by rotation of said column with respect to the frame 3, according to the electrical signal passing through the winding(s) of the pair of sliding parts.

In the case of a translation of the steering column with respect to the frame 3 along a substantially perpendicular direction to that of the axis A, the assembly consisting of the steering column 31 and the actuator 2 (plus, if applicable, the torque and vibration effect system) is in a vertical sliding link with respect to the frame 3.

In the case of rotation of the steering column with respect to the frame about a substantially perpendicular axis (substantially transverse axis) to the axis A, the first end of the column, for example, the end opposite the user, is in a ball joint link with respect to the frame 3 and the second end is in a vertical sliding link with respect to the frame, and a linear electric motor raises/lowers said second end (this may be inverted: the linear electric motor may raise/lower the end opposite the user). This alternative embodiment offers the advantage of operating the sliding parts without any overhang.

In a further embodiment of the invention, the steering column may be horizontal in the neutral position (idle position) and pairs of sliding parts identical (in the operation thereof, but not necessarily in the dimensions, magnet and winding characteristics thereof) to parts 4 and 5 are added and positioned such that the directions of translation of added pairs of sliding parts are substantially orthogonal to the axis A and perpendicular with each other.

The steering column may then move forwards/reverse, be raised/lowered, move or pivot from left to right and conversely (particularly to simulate the acceleration or deceleration movements of the simulated vehicle in any direction with respect to the simulated vehicle or impacts applied to the vehicle from the front, rear, above, below, left or right). In this case, the steering column 31 (and thus the actuator 2) may be mounted suspended by springs with respect to the frame 3.

In a further embodiment, the sliding parts 4 and 5 can be positioned substantially horizontally. In this case, there is no plate 34.

In a further embodiment, the movement sensor is a Hall effect detection set measuring the movement of the steering column 31 with respect to the frame 3. In this case, a magnet is placed on the steering column and one or a plurality of magnetic sensors is provided on the frame 3 (or on a fixed part with respect to the movement of the steering column to be measured). The sensor(s) detect the magnetic field variations, thus deducing the position of the magnet, and thus the data relating to the movement of the steering column with respect to the frame 3 (or with respect to said fixed part).

In a further embodiment, the movement sensor is not a magnetic sensor but a linear potentiometer (a variable linear resistor). The movement of the guiding body 4 with respect to the magnet support plate 5 causes a variation of the resistance and the data relating to the movement of the guiding body is deduced from this variation. Said linear potentiometer may for example engage with the pair of sliding parts; more specifically, the cursor of said potentiometer can be rigidly connected to one of the sliding parts whereas the frame of said potentiometer can be rigidly connected to the other sliding part.

In a further alternative embodiment, the potentiometer can engage with the sliding part rigidly connected to the steering column and the frame 3.

In a further embodiment, there is no movement sensor.

In one particular embodiment, it is possible to envisage at least one stress sensor for measuring the forces applied on the actuator 2 (or on the steering column or one of the sliding parts). Each stress sensor is connected to said microprocessor.

When the stress applied on the actuator 2 (or on the steering column or one of the sliding parts) exceeds a predetermined threshold, the microprocessor adjusts the electrical signal such that the stress measured remains below said threshold or the microprocessor commands the shutdown of any electrical signal in the winding(s) (and/or in the rotary electric motor 41) such that the force and vibration feedback system and/or the torque and vibration effect system stops counteracting the player's exertions.

The actuator 2 may comprise a connector whereon a cable can be connected, for electricity power supply and/or data transmission (for example, information on the rotation of the actuator 2, and, if applicable, additional information, such as a gear shift command, when the user actuates the paddles 25, or further commands triggered by activating the knobs 26 (seen in FIG. 1) situated on the actuator 2.

In a further embodiment, the magnet(s) rigidly connected to one of the sliding parts is/are replaced by a coil producing a magnetic field.

In a further embodiment, the torque and vibration effect system is replaced by a brushless three-phase rotary electric motor wherein the shaft (rotor) forms, in part or in whole, the steering wheel steering column or is rigidly connected to the steering wheel steering column in rotation. At least one magnet is rigidly connected to the shaft of this motor. A Hall effect sensor can be used to measure the rotation of this magnet. This brushless three-phase rotary electric motor does not act on the actuator via transmission means (gears, pulleys, cog wheels, belts and chains).

In other words, this rotary electric motor is directly linked with the steering column (the rotary electric motor may be part of said steering column) and acts on the actuator 2 (via the steering column and, depending on the case, via a linking part rendering the actuator detachable from the frame 3). If the actuator comprises knobs and indicator lights (or more generally elements running on electricity), the shaft of said brushless motor is preferably hollow or comprises a longitudinal groove to provide a passage for electric wires for the data transmission and electrical power supply of said knobs and indicator lights.

In one alternative of this embodiment, data transmission can be performed wirelessly by magnetic induction. In this case, a magnetic induction loop is positioned inside the frame 3 and a receiver coil is positioned in the actuator 2. The data are converted to an electric signal sent in said magnetic induction loop. The current circulating in this loop thus creates a magnetic field modulated by the transmitted data. The receiver coil (or antenna coil), positioned in this magnetic field acts as a sensor and reproduces the initial signal which can then be converted into data (if required, the received signal is previously amplified). If the actuator 2 comprises knobs and indicator lights, magnetic induction may further be used for the electrical power supply thereof.

In a further embodiment, the data can be transmitted wirelessly, by a radiofrequency transmitter (for example, 2.4 GHz) positioned in the actuator 2 (or in the frame 3).

It is possible to envisage, in a particular embodiment, that the actuator can run for a large number of revolutions, or not be limited in the number of revolutions. This is of particular interest when it is required to simulate manoeuvres (for example, run the simulated vehicle for a half-revolution).

Furthermore, the user can easily change an actuator such as a steering wheel to set up a handlebar type actuator if the video game on which the player is playing is simulating a motorbike, instead of a previously mounted steering wheel. It is also possible to envisage a steering wheel version, according to the type of simulated vehicle. For cars, the steering wheel versions may particularly be: Grand Prix, grand touring, rally, jeep, kart, etc. For trains, the versions may be: Micheline rail car, high speed train, etc. For motorcycles, the handlebar versions may be: unprepared motorbike, racing bike, cross-country bike, rally bike, scooter, etc. For bicycles, the handlebar versions may be: racing bicycle, cross-country bicycle, mountain bicycle, city bicycle, etc. For boats, the wheel versions may be: wooden Galleon helm, modern yacht helm, steering wheel, etc. The actuators may thus have various shapes, various diameters, various knobs such that the ergonomics thereof are suitable for the type of simulated vehicle. They may also comprise various vibration motors, they may be wired or wireless (for data transmission), etc.

It is also possible to envisage, in a particular embodiment, that the number of revolutions that can be completed by the actuator 2 with respect to the frame 3 differs according to the type of actuator used.

In one particular embodiment, for flight simulations, particularly for yokes with a relatively long clearance, it is possible to envisage a relatively long movement stroke between a neutral position and a maximum movement position of a first of said sliding parts with respect to a second of said sliding parts.

The shape of the openings of the guiding body is not limited to those described previously.

The invention claimed is:

1. A video game controller having a rotatable actuator with respect to a fixed frame, so as to simulate at least one simulated vehicle steering column rotation control,
characterized in that said actuator is translatably mounted with respect to said fixed frame, on a predetermined movement range, using an assembly of at least two sliding parts with one or both sliding with respect to the other, one of said sliding parts being rigidly connected to said actuator and the other of said sliding parts being rigidly connected to said fixed frame,
a first of said sliding parts comprising at least one slot accessible by at least one opening in which at least one penetrating portion of the second of said sliding parts can move along a separate axis from the rotation movement axis of said actuator,
the translation movement of said actuator being generated by electromagnetic means according to at least one electrical signal having characteristics that vary according to a received command, the first of said sliding parts comprising at least one winding through which said electrical signal passes or at least one magnet and the second of said sliding parts comprising at least one magnet or at least one winding respectively.

2. A video game controller according to claim 1, characterized in that one of said sliding parts comprises at least two windings.

3. A video game controller according to claim 1, characterized in that said slot is accessible via at least two openings.

4. A video game controller according to claim 1, characterized in that the translation movement of said actuator is performed along an axis separate from the axis of rotation of said actuator.

5. A video game controller according to claim 1, characterized in that said actuator is translatably mounted with respect to said frame along at least two non-parrallel directions.

6. A video game controller according to claim 1, characterized in that one of said sliding parts comprises at least one magnet arranged symmetrically with respect to the longitudinal axis and the transverse axis of said sliding part.

7. A video game controller according to claim 1, characterized in that it comprises means for rotational movement of said actuator with respect to said frame so as to simulate/reproduce at least one torque effect or a vibration effect.

8. A video game controller according to claim 1, characterized in that said actuator is detachable from said frame.

9. A video game controller according to claim 1, characterized in that said actuator belongs to the group including: steering wheels; handlebars; helms; yokes.

10. A video game controller according to claim 1, characterized in that said controller comprises a movement sensor for measuring said actual translation movement and providing the data representing said movement to processing means.

11. A video game controller according to claim 1, characterized in that said controller comprises at least one stress sensor for measuring the forces applied on said actuator or on said steering column.

12. A video game controller according to claim 3, characterized in that the second of said sliding parts comprises a penetrating portion whose width is less than the length of said openings of said first sliding part and two parts located at the respective ends of the portion whose width is greater than the length of said openings.

13. A video game controller according to claim 3, characterized in that the second of said sliding parts also comprises at least one prolongation along a perpendicular direction to the longitudinal axis of the penetrating portion.

14. A video game controller according to claim 13, characterized in that said at least one prolongation is movable with respect to a corresponding opening provided in said first sliding part.

15. A video game controller according to claim 1, characterized in that the first of said sliding parts comprises two assembled subassemblies.

16. A video game controller according to claim 15, characterized in that each of said subassemblies comprises at least one winding.

* * * * *